United States Patent
Takada et al.

(10) Patent No.: US 8,097,201 B2
(45) Date of Patent: Jan. 17, 2012

(54) BISPLIT MOLD FOR TIRE FORMING AND PROCESS FOR MANUFACTURING TIRE THEREWITH

(75) Inventors: Noboru Takada, Hiratsuka (JP); Takuzou Sano, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 390 days.

(21) Appl. No.: 12/518,840

(22) PCT Filed: Jun. 4, 2007

(86) PCT No.: PCT/JP2007/061261
§ 371 (c)(1),
(2), (4) Date: Jun. 11, 2009

(87) PCT Pub. No.: WO2008/084564
PCT Pub. Date: Jul. 17, 2008

(65) Prior Publication Data
US 2010/0000659 A1    Jan. 7, 2010

(30) Foreign Application Priority Data

Jan. 11, 2007 (JP) ................................. 2007-003805

(51) Int. Cl.
    *B29C 35/02* (2006.01)
(52) U.S. Cl. ......................................... 264/326; 425/46
(58) Field of Classification Search .................. 264/315, 264/326, 501; 425/46, 47
    See application file for complete search history.

(56) References Cited

U.S. PATENT DOCUMENTS

| 3,778,203 | A | * | 12/1973 | MacMillan | 425/47 |
| 4,013,390 | A | * | 3/1977 | Moeller et al. | 425/46 |
| 5,676,980 | A | * | 10/1997 | Gulka et al. | 425/46 |
| 6,017,206 | A | * | 1/2000 | Soulalioux | 425/46 |
| 6,318,985 | B1 | * | 11/2001 | Heindel et al. | 425/46 |
| 6,632,393 | B2 | * | 10/2003 | Fike | 425/46 |
| 7,976,299 | B2 | * | 7/2011 | Sano et al. | 425/46 |

FOREIGN PATENT DOCUMENTS

| JP | A 2000-127173 | 5/2000 |
| JP | A 2002-337146 | 11/2002 |
| JP | A 2003-136536 | 5/2003 |
| JP | A 2003-340835 | 12/2003 |
| JP | B2 3608161 | 10/2004 |

* cited by examiner

*Primary Examiner* — James Mackey
(74) *Attorney, Agent, or Firm* — Greer, Burns & Crain, Ltd.

(57) ABSTRACT

Provided is a bisplit mold for tire forming capable of avoiding the pinching of the unvulcanized tire at the mold clamping. Also provided is a process for manufacturing a tire by use of the bisplit mold. The bisplit mold includes: a plurality of segments provided to each of the paired containers, and formed by being divided in the tire circumferential direction and; opening-closing means provided to the respective containers, cause the superior and the inferior segments to come close to and separate away from each other, the segments being attached to the pair of containers with vertically bisplit center plates placed between the pair of containers; a superior side plate and an inferior side plate provided respectively to the pair of containers; and vertically bisplit mold pieces provided to the inner sides of the segments.

4 Claims, 4 Drawing Sheets

BISPLIT MOLD FOR TIRE FORMING AND PROCESS FOR MANUFACTURING TIRE THEREWITH

This application is a U.S. National Phase under 35 U.S.C. §371 of International Application No. PCT/JP2007/061261, filed Jun. 4, 2007.

TECHNICAL FIELD

The present invention relates to a bisplit mold for tire forming and a process for manufacturing a tire with the bisplit mold for tire forming. More specifically, the present invention relates to a bisplit mold for tire forming and a process for manufacturing a tire with the bisplit mold for tire forming, which are capable of solving problems that arise in a curing process, and of thus forming a high-performance tire.

BACKGROUND ART

Examples of conventionally known molds used for curing an unvulcanized tire include: a bisplit mold including two, superior and inferior, pieces separated at the tire equatorial plane; and a sectional mold divided, in the circumferential direction of the tire, into plural pieces that expand and contract with respect to the center of the mold.

The bisplit mold is advantageous in making its equipment simple and small-sized, but has the following drawbacks. Releasing a tire having an intricate tread pattern, which is now common, from the bisplit mold is accompanied by a large resistant force. In addition, opening the mold with the tire adhering to the inner surface of the mold may result in the improper production of tires. Moreover, the use of bisplit mold may result in such other problems as cracking.

In contrast, the sectional mold, which has plural tread-segment portions divided in the circumferential direction of the tire, can deal with an intricate tread pattern. Nevertheless, the sectional mold requires providing, separately, a complex sliding mechanism, thereby resulting in an increase in the cost for the mold.

Under these circumstances, proposals have been made for molds for tire curing having a combined structure of a bisplit mold and a sectional mold (see, for example, Patent Documents 1 and 2).

Each of the proposed molds for tire curing has a structure that makes the plural divided segments expand and contract with respect to the center of the mold along with the opening-and-closing motion of vertically bisplit, superior and inferior, split shells. The use of elastic force of springs for the opening-and-closing action of the segmented mold, however, results in a complex structure. In addition, at mold clamping, mold clamping forces do not act uniformly on the segments, thereby preventing the stable mold clamping. The unstable clamping action causes a problem in that the unvulcanized tire is pinched between the segments, resulting in a defective tire product.

Patent Document 1: Japanese patent No. 3608161
Patent Document 2: Japanese patent application Kokai publication No. 2000-127173

DISCLOSURE OF THE INVENTION

Problems to be Solved by the Invention

The present invention has been made focusing on the problems in the conventional techniques. Accordingly, an object of the present invention is to provide a bisplit mold for tire forming with the following features. The bisplit mold, having a simple and small-sized structure, can be used for manufacturing high-performance tires. At mold clamping, the pinching of the unvulcanized tire can be avoided, thereby reducing the problems at the curing, resulting in a higher yielding in production. In addition, the present invention also aims to provide a process for manufacturing a tire by use of the bisplit mold for tire forming.

Means For Solving The Problems

To achieve the above-mentioned objects, the present invention provides a bisplit mold for tire forming with the following features. The bisplit mold for tire forming includes: a pair of superior and inferior containers which are formed by being vertically split into superior and inferior halves at a substantial center in a height direction and which come close to and separate away from each other; ring-shaped container rings which are provided respectively to the containers in the tire circumferential direction; a plurality of segments which are provided to each of the containers, and formed by being divided in the tire circumferential direction, the segments each engaging with the corresponding container ring so as to be slidable on an inclined plane formed in the container ring and; opening-closing means which are provided to the respective containers, and cause the superior and the inferior segments to come close to and separate away from each other, the superior and the inferior segments being attached to the pair of superior and inferior containers with vertically bisplit center plates placed between the pair of superior and inferior containers; a superior side plate and an inferior side plate which are attachably and detachably provided respectively to the pair of superior and inferior containers; and vertically bisplit mold pieces for tire forming which are provided to each of the containers, and attachably and detachably provided to the inner sides of the segments, respectively. In the bisplit mold for tire forming, slide unit means are provided respectively in sliding portions formed between the superior segments and a superior one of the vertically bisplit center plates and between the inferior segments and an inferior one of the vertically bisplit center plates, the slide unit means being configured to slide the superior and the inferior segments towards a center axis of the tire, inclined guide pins stick out from the pair of superior and inferior containers to the inner side of the pair of superior and inferior containers, and the guide pins are slidably fitted respectively into guide holes formed in the corresponding segments.

In the bisplit mold for tire forming, in the slide unit means, guide slots are formed respectively in slide bases embedded in the center plates, inclined pin holders engage slidably with the guide slots, respectively, and swing pins are provided so that one end of each of the swing pins is connected to the corresponding one of the inclined pin holders and the other end of each swing pin is embedded in and fixed to the corresponding one of the segments, thereby the swing pin being aligned on the same line as the extended line of the inclination angle of the corresponding one of the guide pins.

In addition, the present invention provides a process for manufacturing a tire with a bisplit mold for tire forming the bisplit mold including: a pair of superior and inferior containers; container rings which are provided respectively to the containers in the tire circumferential direction; a plurality of segments which are provided to each of the containers, and formed by being divided in the tire circumferential direction, the segments each engaging with the corresponding container ring so as to be slidable on an inclined plane formed in the container ring and; opening-closing means which are provided to the respective containers, and cause the superior and the inferior segments to come close to and separate away from each other, the superior and the inferior segments being attached to the pair of superior and inferior containers with vertically bisplit center plates placed between the pair of superior and inferior containers; a superior side plate and an inferior side plate which are attachably and detachably provided respectively to the pair of superior and inferior containers; and vertically bisplit mold pieces for tire forming which are provided to each of the containers, and attachably and detachably provided to the inner sides of the segments respectively; slide unit means which are provided respectively in sliding portions formed between the superior segments and a superior one of the vertically bisplit center plates and between the inferior segments and an inferior one of the vertically bisplit center plates, the slide unit means being configured to slide the superior and the inferior segments towards a center axis of the tire; and inclined guide pins which stick out from the pair of superior and inferior containers to the inner side of the pair of superior and inferior containers, and which are slidably fitted respectively into guide holes formed in the corresponding segments. The process comprises the steps of: placing an unvulcanized tire along the mold pieces for tire forming as well as along the superior side plate and the inferior side plate while the pair of superior and the inferior containers of the bisplit mold for tire forming is vertically open; retracting, radially, the superior and the inferior segments towards the center axis of the unvulcanized tire by making the superior and the inferior segments slide on the inclined planes formed respectively in the container rings when the mold clamping using the superior and the inferior side plates is carried out by lowering the superior side plate; and subsequently, carrying out a curing process of the tire in a way that mold clamping of the mold pieces for tire forming is carried out using the slide unit means by driving the opening-closing means disposed between the pair of superior and inferior containers.

In the process for manufacturing a tire with the bisplit mold for tire forming of the present invention, the unvulcanized tire is any one of an unvulcanized tire formed by use of a making drum and an unvulcanized tire manufactured by use of a rigid core.

Effects of the Invention

The present invention provides a bisplit mold for tire forming with the following configuration. The bisplit mold for tire forming includes: a pair of superior and inferior containers which are formed by being vertically split into superior and inferior halves at a substantial center in a height direction and which come close to and separate away from each other; ring-shaped container rings which are provided respectively to the containers in the tire circumferential direction; a plurality of segments which are provided to each of the containers, and formed by being divided in the tire circumferential direction, the segments each engaging with the corresponding container ring so as to be slidable on an inclined plane formed in the container ring and; opening-closing means which are provided to the respective containers, and cause the superior and the inferior segments to come close to and separate away from each other, the superior and the inferior segments being attached to the pair of superior and inferior containers with vertically bisplit center plates placed between the pair of superior and inferior containers; a superior side plate and an inferior side plate which are attachably and detachably provided respectively to the pair of superior and inferior containers; and vertically bisplit mold pieces for tire forming which are provided to each of the containers, and attachably and detachably provided to the inner sides of the segments, respectively. In the bisplit mold for tire forming, slide unit means are provided respectively in sliding portions formed between the superior segments and a superior one of the vertically bisplit center plates and between the inferior segments and an inferior one of the vertically bisplit center plates, the slide unit means being configured to slide the superior and the inferior segments towards a center axis of the tire, inclined guide pins stick out from the pair of superior and inferior containers to the inner side of the pair of superior and inferior containers, and the guide pins are slidably fitted respectively into guide holes formed in the corresponding segments. With this configuration, the bisplit mold has the following excellent effects.

(a) The curing process for a high-performance tire can be done by use of a bisplit mold. The tire thus manufactured can have an improved uniformity.

(b) The opening-closing means are provided between the pair of superior and inferior containers, and the slide unit means are provided in the sliding portion between each of the segments and the corresponding one of the vertically split center plates. Accordingly, the apparatus as a whole can be simple and smaller in size.

(c) The pinching of the unvulcanized tire that might otherwise take place at the mold clamping can be avoided, thereby leading to reduction of the problems arising at the curing and higher yielding.

(d) Vacuum curing can be done with no lifting force exerted on the tire, so that a ventless tire with a fine appearance can be manufactured.

(e) The mold for tire forming is unlikely to come into close contact with the inner surface of the tire, so that the troubles occurring in the inner side of the tire are reduced.

(f) The curing is possible both with an unvulcanized tire formed by use of a common making drum and with an unvulcanized tire formed by use of a rigid core.

DESCRIPTION OF REFERENCE NUMERALS 1a, 1b base plate
2a, 2b support plate
3a, 3b container
4 driving means
5 container ring
6 inclined plane
7 segment
7a guide hole
8 opening-closing means
8a guide pin
9a superior side plate
9b inferior side plate
10a, 10b center plate
11 mold for tire forming
12 slide unit means 13 guide pin
14 slide base
15 guide slot
16 inclined pin holder
17 swing pin

BEST MODES FOR CARRYING OUT THE INVENTION

Hereinafter, an embodiment of the present invention will be described by reference to the accompanying drawings.

Figure 1:
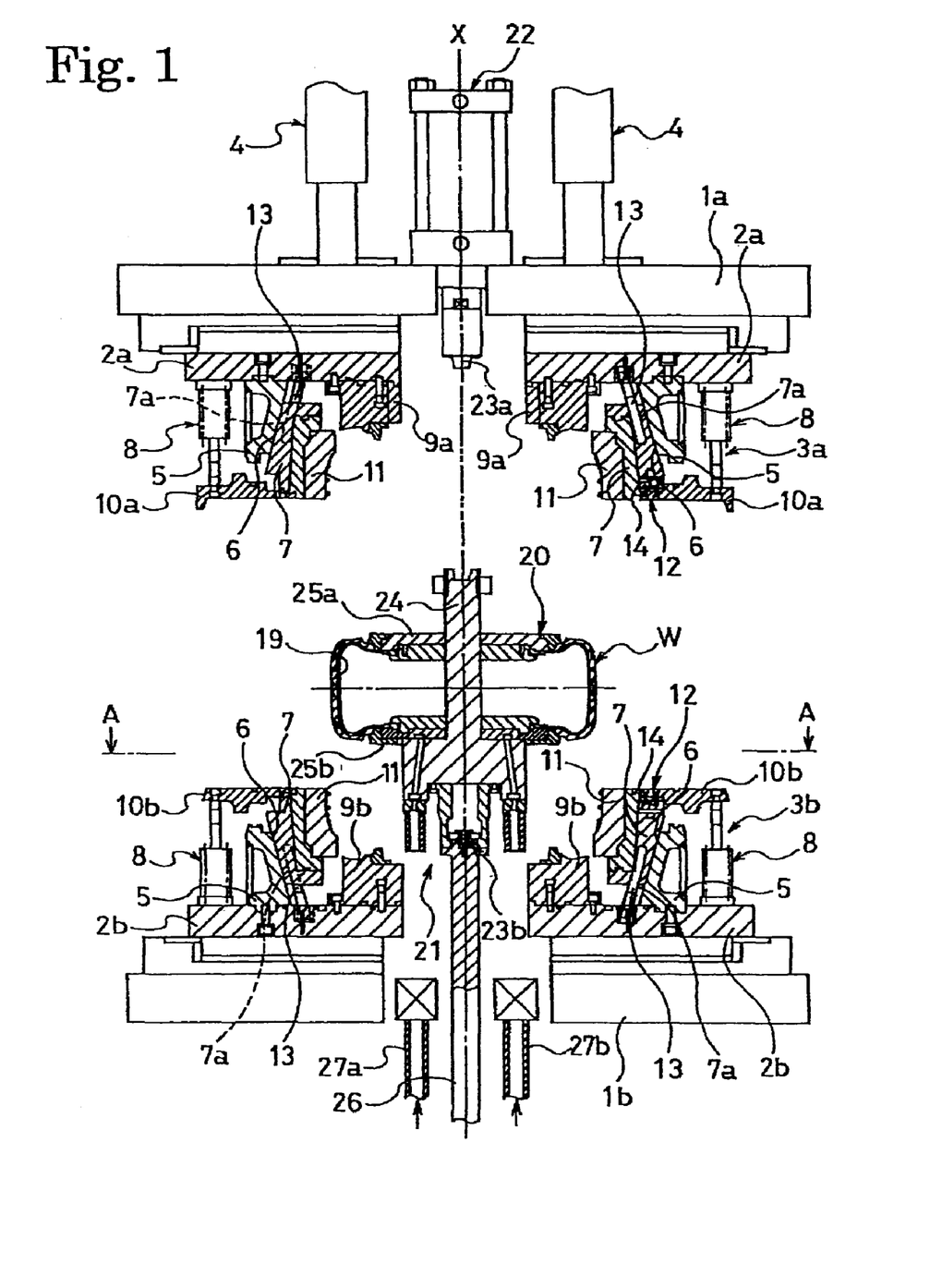
FIG. 1 is a schematic configuration diagram illustrating a bisplit mold for tire forming of the present invention at the time when the mold is opened.
Figure 2:
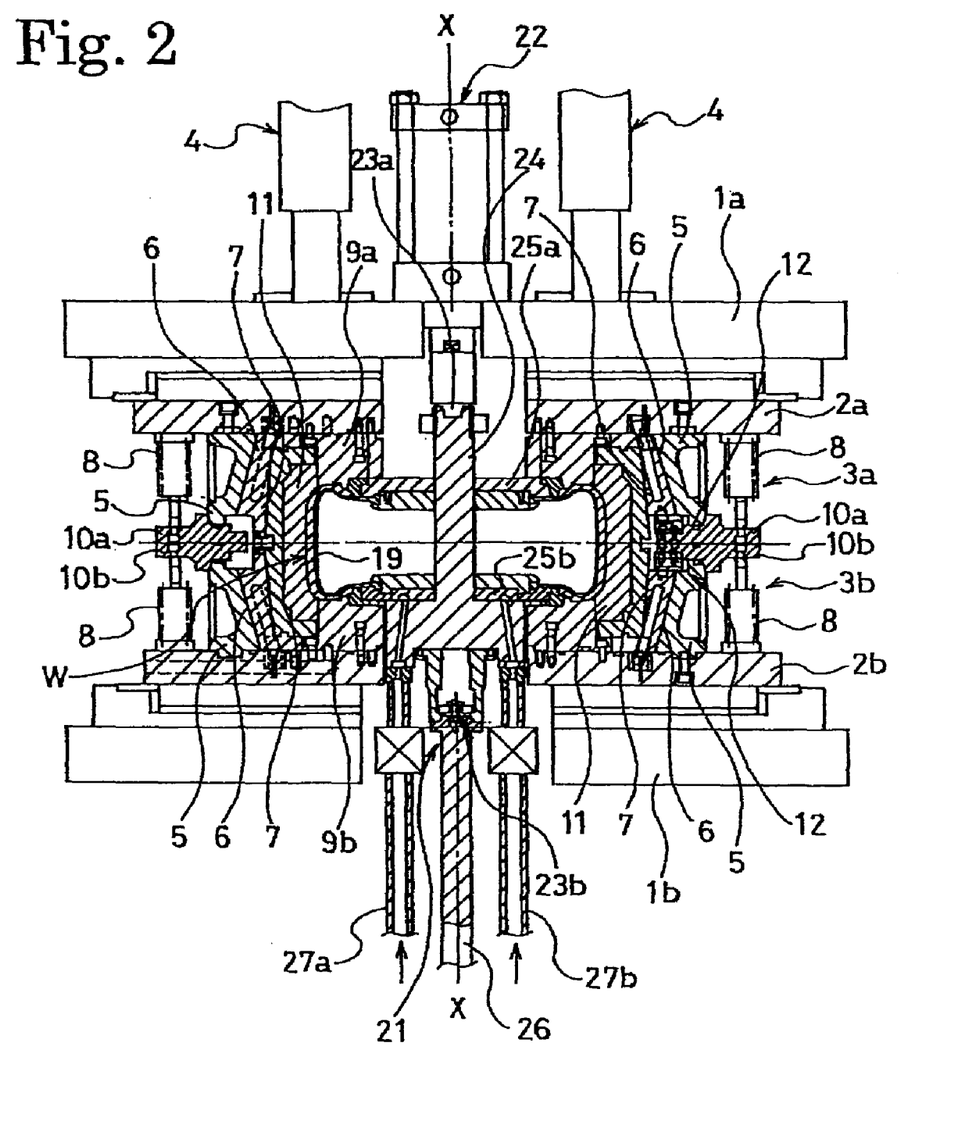
FIG. 2 is a schematic configuration diagram illustrating the bisplit mold for tire forming of FIG. 1 at the time when the mold is closed.
Figure 3:
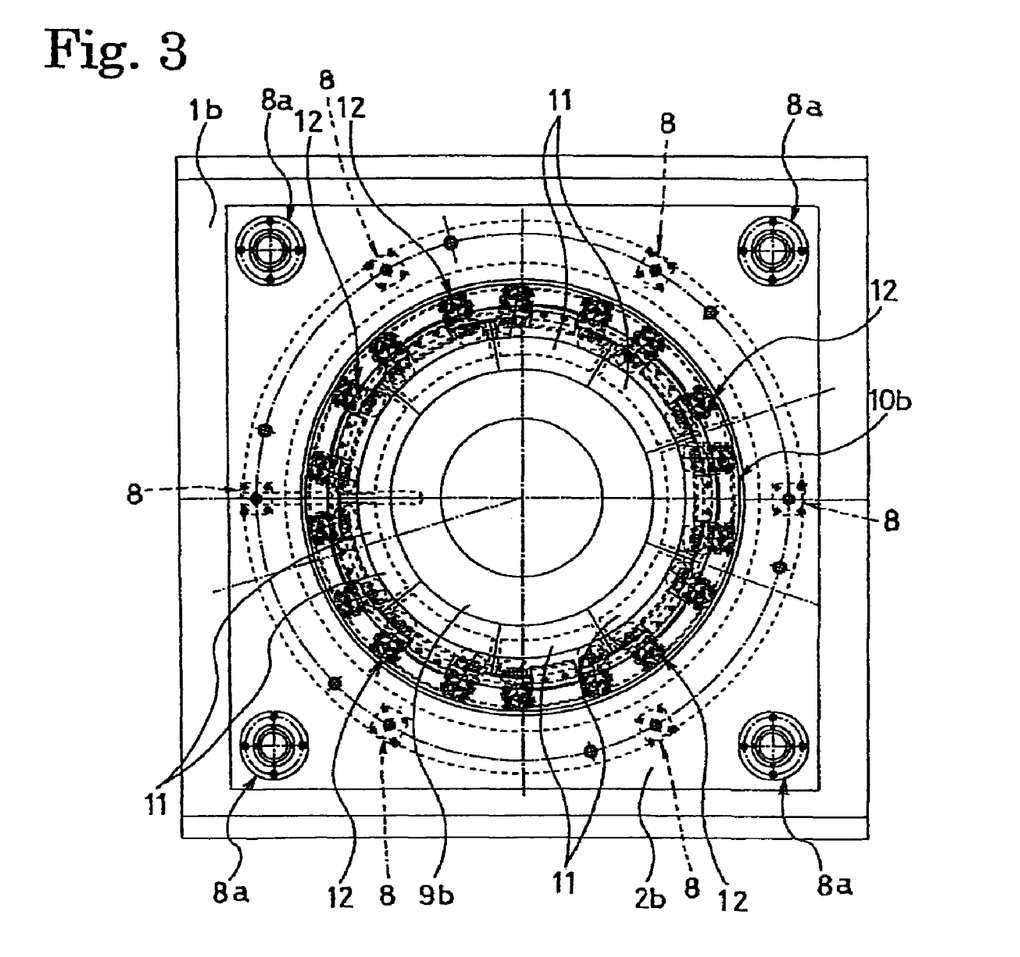
FIG. 3 is a plan view seen as indicated by the arrows A-A of FIG. 1.

FIG. 1 is a schematic configuration diagram illustrating a bisplit mold for tire forming of the present invention at the time when the mold is opened. FIG. 2 is a schematic configuration diagram illustrating the bisplit mold for tire forming at the time when the mold is closed. FIG. 3 is a plan view seen as indicated by the arrows A-A of FIG. 1. The bisplit mold for tire forming includes a pair of vertically bisplit superior and inferior containers 3a and 3b. Support plates 2a and 2b provided respectively on the inner-side surfaces of superior and inferior base plates 1a and 1b, which are opposed to each other, are supported by the support place 2a and 2b, respectively. The base plates 1a for at least one of the vertically bisplit containers 3a and 3b (the superior container 3a, in this embodiment) is provided with driving means 4 that are provided so as to stand approximately at the center in the height direction of the bisplit mold. The driving means 4 are capable of bringing the bisplit containers 3a and 3b closer to and move away from each other, and hydraulic cylinders, for example, may be used as the driving means 4.

Each of the containers 3a and 3b includes a container ring 5, plural segments 7, and plural opening-closing means 8. The container ring 5 is disposed at the inner side of the corresponding one of the support plates 2a and 2b. An inclined plane 6 of a predetermined angle is formed in the container ring 5. The plural segments 7, which are formed by being divided in the circumferential direction of the tire (specifically nine segments 7 are formed by being divided in this embodiment, but the number of segments is not limited to a certain number), are slidable on the inclined plate 6 and engage with the container ring 5. Examples of the plural opening-closing means 8 are plural hydraulic cylinders (specifically, six opening-closing means 8 are provided in this embodiment, but the number of the opening-closing means 8 is not limited to a certain number). The containers 3a and 3b also include a superior side plate 9a and an inferior side plate 9b, respectively. Vertically bisplit center plates 10a and 10b are attached to the leading ends of the rods of the corresponding ones of the opening-closing means 8, and arranged so as to be parallel with the splitting plane of the vertically bisplit containers 3a and 3b. Members each denoted by reference numeral 8a in FIG. 3 are guide pins.

Figure 4:
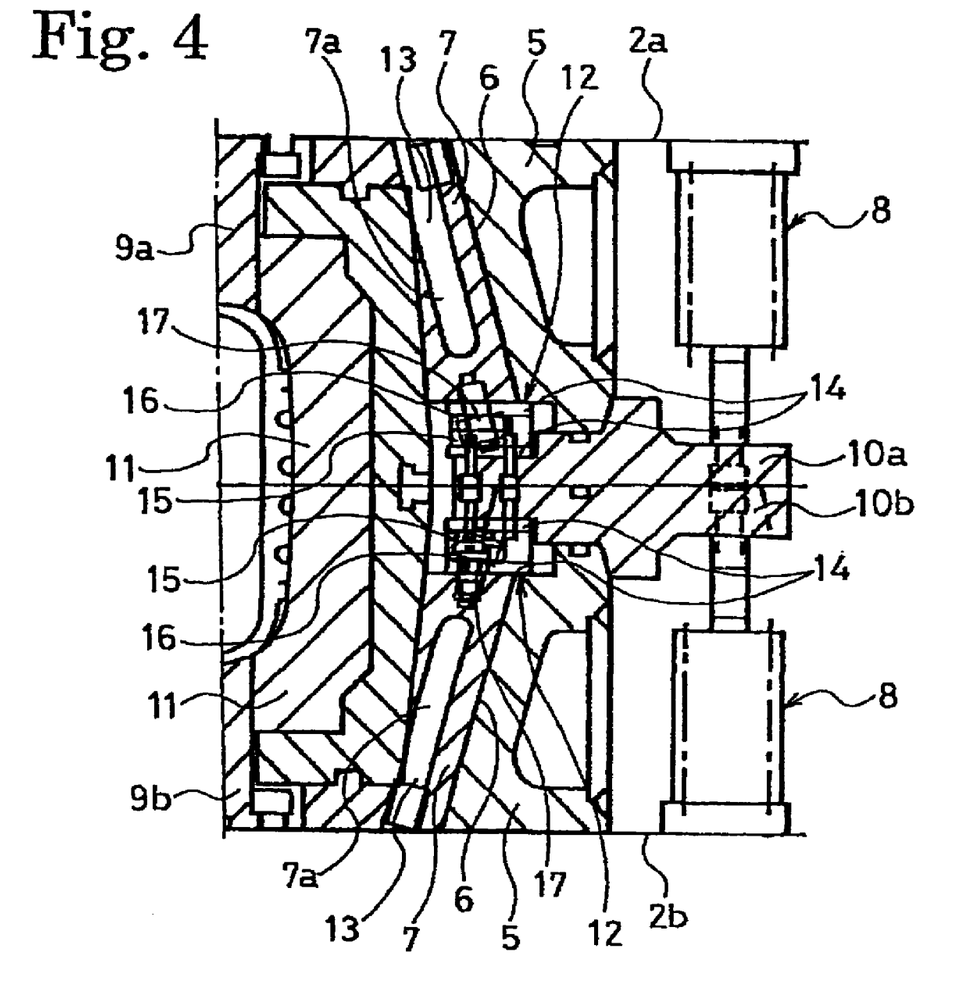
FIG. 4 is an enlarged sectional view of a slide-unit means.

Mold pieces 11 for tire forming are attachably and detachably provided to the inner sides of the segments 7. Each of the mold pieces 11 for tire forming has a predetermined profile and is formed as a result of dividing a mold into plural sections in the circumferential direction and of splitting each of the resultant sections of the mold into two pieces at the center in the vertical direction. As FIG. 4 shows, plural slide unit means 12 are provided respectively at slide portions where either one of the vertically bisplit center plates 10a and 10b slides on the plural segments 7 formed by being divided in the circumferential direction of the tire. The slide unit means can cause pairs of superior and inferior segments 7 to slide towards the center axis X-X of the tire.

Guide pins 13 are provided on the inner sides of the support plates 2a and 2b and stick out so as to be inclined at a predetermined angle. The guide pins 13 are designed to be slidably fitted respectively into guide holes 7a formed in the corresponding segments 7.

As FIG. 4 shows, in each of the slide unit means 12, a slide base 14 is embedded in either one of the center plates 10a and 10b. A guide slot 15 is formed in each of the slide bases 14, and an inclined pin holder 16 engages slidably with the corresponding guide slot 15. A swing pin 17 that is swingable about a hinge is provided with one of its ends connected to the inclined pin holder 16. The other end of the swing pin 17 is fixed by being embedded in the corresponding segment 7 so as to be aligned on the same line that is drawn by the inclination angle of the guide pin 13 fitted into the guide hole 7a formed in the segment 7.

Suppose a state where the mold pieces 11 for tire forming are fitted to their respective superior and inferior segments 7 and where the pair of containers 3a and 3b are closed with the superior segments 7 coming into contact with their respective inferior segments 7. In that state, the upper-side container ring 5 is raised up and lowered down with the contracting motion of the driving means 4, so that the superior side plate 9a attached to the upper-side support plate 2a is also raised up. As the upper-side support plate 9a moves upwards, the segments 7 that hold their respective mold pieces 11 for tire forming are moved away from the center axis X-X of the tire by, for example, the frictional forces acting on the inclined plane 6 of the container ring 5 and on the guide pins 13.

Subsequently, the vertically bisplit center plates 10a and 10b are moved with the extending motion of the opening-closing means 8 of the superior and inferior slide unit means 12 so as to be synchronized with the contracting motion of the driving means 4. Then, the swing pins 17 provided respectively to the inclined pin holders 16 that slidably engage respectively with the guide slots 15 make the segments 7 that hold their respective mold pieces 11 for tire forming move further away from the center direction X-X of the tire.

A bladder central mechanism 21 is provided in the central portion of the pair of vertically-bisplit containers 3a and 3b that can be opened and closed. The bladder central mechanism 21 is designed to hold either an unvulcanized tire W formed by use of a common making drum or an unvulcanized tire W formed by use of a rigid core. The bladder central mechanism 21 is provided with a superior-mold ejector 23a and an inferior-mold ejector 23b. The superior-mold ejector 23a and the inferior-mold ejector 23b are disposed so as to be vertically opposed to each other, on the same axis which is the center axis X-X of the tire of the superior base plate 1a and in the inferior base plate 1b. An elevator cylinder 22 is provided to install the superior-mold ejector 23a while an unillustrated elevator cylinder is provided to install the inferior-mold ejector 23b.

The member denoted by reference numeral 19 in the drawings is a bladder while reference numeral 20 denotes a clamp mechanism for the unvulcanized tire W. The clamp mechanism 20 includes a center shaft 24, a superior press plate 25a, and an inferior pressing plate 25b. The member denoted by reference numeral 26 in the drawings is a center post while reference numerals 27a and 27b are pipes used for introducing a heating medium (for example, air, pressurized steam, or an inert gas such as nitrogen gas) into the unvulcanized tire W. Note that, in this embodiment, an assembly formed by fitting the superior and the inferior pressing plates 25a and 25b onto the center shaft 24 is incorporated into the containers 3a and 3b. In an alternative structure, the superior pressing plate 25a may be attached to the superior side plate 9a while the inferior pressing plate 25b may be attached to the inferior side plate 9b. In addition, the containers 3a and 3b may be provided with an vacuum mechanism.

Subsequently, a method for curing a tire W by use of the above-described bisplit mold will be described by reference to the drawings.

To begin with, as FIG. 1 shows, the superior container 3a is lifted up by the driving means 4, and the vertically bisplit center plates 10a and 10b are moved by extending their corresponding opening-closing means 8. In addition, the center post 26 is lifted up by an unillustrated driving apparatus.

Then, either an unvulcanized tire W (that has been clamped outside) formed by a common making drum or an unvulcanized tire W (green tire) removed from a rigid core is conveyed by a conveying apparatus and is inserted into the central portion between the center plates 10a and 10b. Alternatively, an unvulcanized tire W with its upper-side bead ring attached to the elevator cylinder 22 is inserted into the central portion between the center plates 10a and 10b. In addition, the unvulcanized tire W is clamped with a clamp mechanism 20 and held in that state by making an unillustrated driving means lift up the center post 26.

Subsequently, the superior container 3a that is suspended from the superior base plate 1a is lowered down by the driving means 4. In addition, the superior-mold ejector 23a is made, by extending the elevator cylinder 22, to determine the holding position for the upper-surface side of the unvulcanized tire W.

In this state, the superior container 3a and the center post 26 are lowered down by the driving means 4 while being synchronized with each other until the superior and the inferior center plates 10a and 10b come into contact with each other. In this event, synchronized action is required so that the center of the unvulcanized tire W can lie exactly on the central positions of the center plates 10a and 10b. In addition, while the driving means 4 are lowering the superior container 3a down, the opening-closing means 8 are brought into action in a coordinated manner. The mold clamping is carried out in this way.

To be more specific, when the driving means 4 lower the superior container 3a down, the container ring 5 attached to the superior support plate 2a and the guide pins 13 attached likewise are lowered down. In addition, the segments 7, which can slide along the inclined plane 6 of the container ring 5 and which engage with the container ring 5, as well as the slide unit means 12 are lowered down.

Then as described above, when the leading ends of the superior and the inferior center plates 10a and 10b of the slide unit means 12 come into contact with each other, the segments 7 are moved towards the center axis X-X of the tire by contracting the opening-closing means 8 in a synchronized manner. Subsequently, as the center post 26 that holds the unvulcanized tire W is being lowered down, the slide unit means 12 of the superior and the inferior containers 3a and 3b, the segments 7, and the container ring 5 are lowered down. Thus, the mold clamping of the segments 7 and the container ring 5 is started.

Subsequently, when further mold clamping is carried out using the superior and the inferior containers 3a and 3b, the segments 7 that engage with the guide pins 13 and the container ring 5 at the inclined planes 6 are horizontally moved towards the center axis X-X of the tire so as to contract radially. The mold clamping is carried out by contracting radially the segments 7 after the superior and the inferior center plates 10a and 10b come into contact with each other and thus become a vertically closed state. Accordingly, the problem of pinching the unvulcanized tire W between the divided mold pieces 11 for tire forming can be avoided.

The center post 26 is further lowered down until the side portion of the unvulcanized tire W comes into contact with the inferior side plate 9b. In this state, the pipes 27a and 27b that have come into contact with the bladder central mechanism 21 are connected therewith by clamping.

In this way, the mold clamping is completed by the synchronized action of the driving means 4 and opening-closing means 8 and by the action of the slide unit means 12. On completion of the mold clamping, vacuum means (vacuum suction means) connected to an unillustrated vacuum passage formed in the container ring 5 is activated to vacuum the inside of the mold pieces 11 for tire forming that have clamped the unvulcanized tire W. Concurrently, the curing of the unvulcanized tire W is carried out by introducing a heating medium (for example, air, pressurized steam, or an inert gas such as nitrogen gas) into the unvulcanized tire W through the pipes 27a and 27b.

The curing of the unvulcanized tire W continues for a predetermined length of time, and then a step of releasing the vulcanized tire from the mold is started.

At the start of this mold-releasing step, the heating medium is discharged from the inside of the cured tire, and the pressure inside the cured tire is lowered down to a predetermined pressure.

Subsequently, while the superior container 3a is being lifted up by the driving means 4, the superior and inferior opening-closing means 8 are extended. The extending action of the superior and inferior opening-closing means 8 brings the superior and the inferior center plates 10a and 10b into contact with each other.

Making the driving means 4 lift the superior container 3a up with the superior and the inferior center plates 10a and 10b being in contact with each other releases, from the cured tire, the superior and the inferior segments 7 that engage with the corresponding one of the superior and the inferior container rings 5 using the inclined planes 6 (that is, the segments 7 moves expanding radially). Then, the mold pieces 11 for tire forming attached to the superior and the inferior segments 7 can be released from the cured tire at the stroke end of the opening-closing means 8.

While the center plates 10a and 10b is still in contact with each other, the opening-closing means 8 of the slide unit means 12 extends so that the segments 7 perform the action of leaving the mold. Such action of the segments 7, however, does not immediately lead to the radial expansion of the segments 7 in which the guide pins 13 are embedded. In this state, the inclined pin holders 16 slide, along with the movement of the center plates 10a and 10b, on their respective guide slots 15 that are formed respectively in the slide bases 14. As the sliding of the inclined pin holders 16 swings their respective swing pins 17, the segments 7 to which the mold pieces 11 for the tire forming are attached gradually expand radially. Thus the segments 7 are released from the surface of the cured tire.

Once the mold pieces 11 for tire forming have been released from the cured tire, the driving means 4 lift the superior container 3a upwards. Then, the superior-mold ejector 23a is lifted up by contracting the elevator cylinders 22, so as to be separated away from the upper-surface side of the formed tire. Subsequently, the driving means 4 lift the superior container 3a further upwards, so that the clamping of the pipes 27a and 27b of the heating means connected to the bladder central mechanism 21 is cancelled. In addition, the center post 26 which has lifted upward during the time of releasing the cured tire from the mold is stopped at a predetermined position (position for taking out the tire). Then, the camp apparatus of the center post 26 is disengaged, and, after that, the cured tire is taken out at the position for taking out the tire. The taken-out tire is then conveyed to the subsequent process, and thus the work is finished.

As has been described thus far, in this embodiment, the unvulcanized tire W is placed inside the bisplit containers 3a and 3b, which are in an open-mold state, along the mold pieces 11 for tire forming and along the superior and the inferior side plates 9a and 9b. In addition, when the mold clamping using the superior and the inferior side plates 9a and 9b is carried out by lowering the superior side plate 9a, the segments 7 and the pair of superior and inferior container rings 5 are contracted radially towards the center axis X-X of the tire. During the mold clamping using the mold pieces 11 for tire forming, the opening-closing means 8 disposed between the pair of superior and inferior containers 3a and 3b are driven. With the driving of the opening-closing means 8, the mold clamping of the mold pieces 11 for tire forming are carried out using the slide unit means 12, and thus the curing of the tire W is carried out. Accordingly, the curing of a high-performance tire can be done with the bisplit mold, and the uniformity of the tire can be improved.

In addition, the problems at the curing can be reduced by avoiding the pinching of the unvulcanized tire W that might otherwise take place at the mold clamping of the mold pieces 11 for tire forming, so that the yielding can be enhanced. In addition, the vacuum curing can be done with no lifting force exerted on the tire W, so that a ventless tire with a fine appearance can be manufactured. Moreover, the mold 11 is unlikely to come into close contact with the inner surface of the tire, so that the troubles inside the tire can be reduced.

What is claimed is:

1. A bisplit mold for tire forming including:
a pair of superior and inferior containers which are formed by being vertically split into superior and inferior halves at a substantial center in a height direction and which come close to and separate away from each other;
ring-shaped container rings which are provided respectively to the containers in the tire circumferential direction;
a plurality of segments which are provided to each of the containers, and formed by being divided in the tire circumferential direction, the segments each engaging with the corresponding container ring so as to be slidable on an inclined plane formed in the container ring;
opening-closing means which are provided to the respective containers, and cause the superior and the inferior segments to come close to and separate away from each other, the superior and the inferior segments being attached to the pair of superior and inferior containers with vertically bisplit center plates placed between the pair of superior and inferior containers; and
a superior side plate and an inferior side plate which are attachably and detachably provided respectively to the pair of superior and inferior containers; and
vertically bisplit mold pieces for tire forming which are provided to each of the containers, and attachably and detachably provided to the inner sides of the segments, respectively, wherein
slide unit means are provided respectively in sliding portions formed between the superior segments and a superior one of the vertically bisplit center plates and between the inferior segments and an inferior one of the vertically bisplit center plates, the slide unit means being configured to slide the superior and the inferior segments towards a center axis of the tire,
inclined guide pins stick out from the pair of superior and inferior containers to the inner side of the pair of superior and inferior containers, and
the guide pins are slidably fitted respectively into guide holes formed in the corresponding segments.

2. The bisplit mold for tire forming according to claim 1 wherein, in the slide unit means,
guide slots are formed respectively in slide bases embedded in the center plates,
inclined pin holders engage slidably with the guide slots, respectively, and
swing pins are provided so that one end of each of the swing pins is connected to the corresponding one of the inclined pin holders and the other end of each swing pin is embedded in and fixed to the corresponding one of the segments, thereby the swing pin being aligned on the same line as the extended line of the inclination angle of the corresponding one of the guide pins.

3. A process for manufacturing a tire with a bisplit mold for tire forming,
the bisplit mold including:
a pair of superior and inferior containers;
container rings which are provided respectively to the containers in the tire circumferential direction;
a plurality of segments which are provided to each of the containers, and formed by being divided in the tire circumferential direction, the segments each engaging with the corresponding container ring so as to be slidable on an inclined plane formed in the container ring;
opening-closing means which are provided to the respective containers, and cause the superior and the inferior segments to come close to and separate away from each other, the superior and the inferior segments being attached to the pair of superior and inferior containers with vertically bisplit center plates placed between the pair of superior and inferior containers;
a superior side plate and an inferior side plate which are attachably and detachably provided respectively to the pair of superior and inferior containers;
vertically bisplit mold pieces for tire forming which are provided to each of the containers, and attachably and detachably provided to the inner sides of the segments respectively;
slide unit means which are provided respectively in sliding portions formed between the superior segments and a superior one of the vertically bisplit center plates and between the inferior segments and an inferior one of the vertically bisplit center plates, the slide unit means being configured to slide the superior and the inferior segments towards a center axis of the tire; and
inclined guide pins which stick out from the pair of superior and inferior containers to the inner side of the pair of superior and inferior containers, and which are slidably fitted respectively into guide holes formed in the corresponding segments,
the process comprising the steps of:
placing an unvulcanized tire along the mold pieces for tire forming as well as along the superior side plate and the inferior side plate while the pair of superior and the inferior containers of the bisplit mold for tire forming is vertically open;
retracting, radially, the superior and the inferior segments towards the center axis of the unvulcanized tire by making the superior and the inferior segments slide on the inclined planes formed respectively in the container rings when the mold clamping using the superior and the inferior side plates is carried out by lowering the superior side plate; and subsequently, carrying out a curing process of the tire in a way that mold clamping of the mold pieces for tire forming is carried out using the slide unit means by driving the opening-closing means disposed between the pair of superior and inferior containers.

4. The process for manufacturing a tire with the bisplit mold for tire forming according to claim 3 wherein the unvulcanized tire is any one of an unvulcanized tire formed by use of a making drum and an unvulcanized tire manufactured by use of a rigid core.

* * * * *